United States Patent [19]

Phillips

[11] 4,393,727

[45] Jul. 19, 1983

[54] FRICTION DRIVE

[75] Inventor: Edward H. Phillips, Middletown, Calif.

[73] Assignee: Optimetrix Corporation, Mountain View, Calif.

[21] Appl. No.: 129,214

[22] Filed: Mar. 11, 1980

[51] Int. Cl.³ .............................................. F16H 13/14
[52] U.S. Cl. ..................................... 74/209; 74/411; 474/94
[58] Field of Search .................. 74/202, 206, 409, 410, 74/411, 89, 5.45, 56, 203–205, 207–213; 267/181, 161, 163; 52/39, 7; 192/89 B, 106.1; 474/94

[56] References Cited

U.S. PATENT DOCUMENTS

| | | | |
|---|---|---|---|
| 1,229,618 | 6/1917 | Hunter | 152/86 |
| 1,286,761 | 12/1918 | Payne | 152/86 |
| 1,601,305 | 9/1926 | Hansen | |
| 2,407,757 | 9/1946 | MacCallum | 192/89 B |
| 2,753,731 | 7/1956 | McWethy | 74/443 |
| 2,772,573 | 12/1956 | Thomas | 74/206 X |
| 2,932,785 | 4/1960 | Shovic | 74/202 X |
| 3,175,110 | 3/1965 | Kohlhagen | 74/461 X |
| 3,211,014 | 10/1965 | Sanderson | 74/202 X |
| 3,304,924 | 2/1967 | Dolza | 123/90 |
| 3,306,120 | 2/1967 | Kratzsch, Sr. | 74/202 X |
| 3,406,583 | 10/1968 | Baier | 74/411 |
| 3,589,303 | 6/1971 | Lakin | 74/202 X |
| 3,847,027 | 11/1974 | Bailey | 74/206 X |
| 3,965,762 | 6/1976 | Nessel | 74/210 |
| 4,183,254 | 1/1980 | Good | 74/206 |

FOREIGN PATENT DOCUMENTS

| | | |
|---|---|---|
| 60361 | 2/1890 | Fed. Rep. of Germany . |
| 311406 | 9/1917 | Fed. Rep. of Germany . |
| 433120 | 3/1923 | Fed. Rep. of Germany . |
| 1060213 | 6/1959 | Fed. Rep. of Germany ........ 74/209 |
| 1283035 | 11/1968 | Fed. Rep. of Germany . |
| 1808254 | 6/1969 | Fed. Rep. of Germany . |
| 2730790 | 1/1978 | Fed. Rep. of Germany ............ 52/7 |
| 1426444 | 1/1965 | France . |
| 52-46258 | 4/1977 | Japan ..................................... 74/202 |
| 276 | of 1859 | United Kingdom .................. 74/210 |

Primary Examiner—Lawrence J. Staab
Attorney, Agent, or Firm—Roland I. Griffin

[57] ABSTRACT

A motor-tachometer rotates a drive shaft rotatably supported on an upper support member that is fixedly secured to a lower support member. The drive shaft in turn rotates a compliant rotary member of larger diameter fixedly secured to a driven shaft for rotation therewith. This compliant rotary member is provided with a circular central portion and an annular outer portion coupled together by three springs symmetrically disposed around the periphery of the central portion, and is loaded against the drive shaft so that the annular outer portion is eccentrically offset relative to the circular central portion in a radial direction opposite the drive shaft. The driven shaft is rotatably supported by the lower support member in engagement with a drive bar for moving a stage on which the upper and lower support members are mounted along the drive bar.

10 Claims, 4 Drawing Figures

FRICTION DRIVE

BACKGROUND AND SUMMARY OF THE INVENTION

This invention relates generally to friction drives of the reduction type, and more particularly to an improved friction drive of that type employing a compliant rotary member as either a drive or a driven member thereof.

In conventional friction drives of the reduction type generally noncompliant members are employed as both the drive and the driven members. Such drives typically require more parts, more precision of concentricity and diameter, and may have more backlash than desirable for many applications.

Accordingly, it is the principal object of this invention to provide an improved friction drive of the reduction type having fewer parts and no backlash.

Another object of this invention is to provide a friction drive of the reduction type, as in the last object, that may be employed for driving a stage of the precision step-and-repeat alignment and exposure system.

Another object of this invention is to provide a compliant rotary member that may be employed, for example, as either a drive member or a driven member in a friction drive of the reduction type.

Still another object of this invention is to provide a compliant rotary member that, when employed as in the last object, makes the precision of concentricity and diameter of both the drive and the driven members less critical than would be the case if a noncompliant rotary member were employed.

These objects are accomplished according to the illustrated preferred embodiment of this invention by mounting a motor-tachometer on a first support member, by providing the motor-tachometer with a hardened rotary drive shaft, by mounting a rotary driven shaft on a second support member, and by mounting a compliant rotary member of greater diameter than the hardened drive shaft on the driven shaft in abutment with the drive shaft. The compliant rotary member comprises a central portion coupled to an outer portion by three springs symmetrically arranged around the periphery of the central portion and each rigidly attached at one end to the inner portion and at the other end to the outer portion. In assembling the friction drive, the first and second support members are secured together so that the rotary compliant member is forced against the hardened drive shaft and so that the outer portion of the rotary compliant member is eccentrically offset with respect to the central portion.

DESCRIPTION OF THE PREFERRED EMBODIMENT

Figure 1:
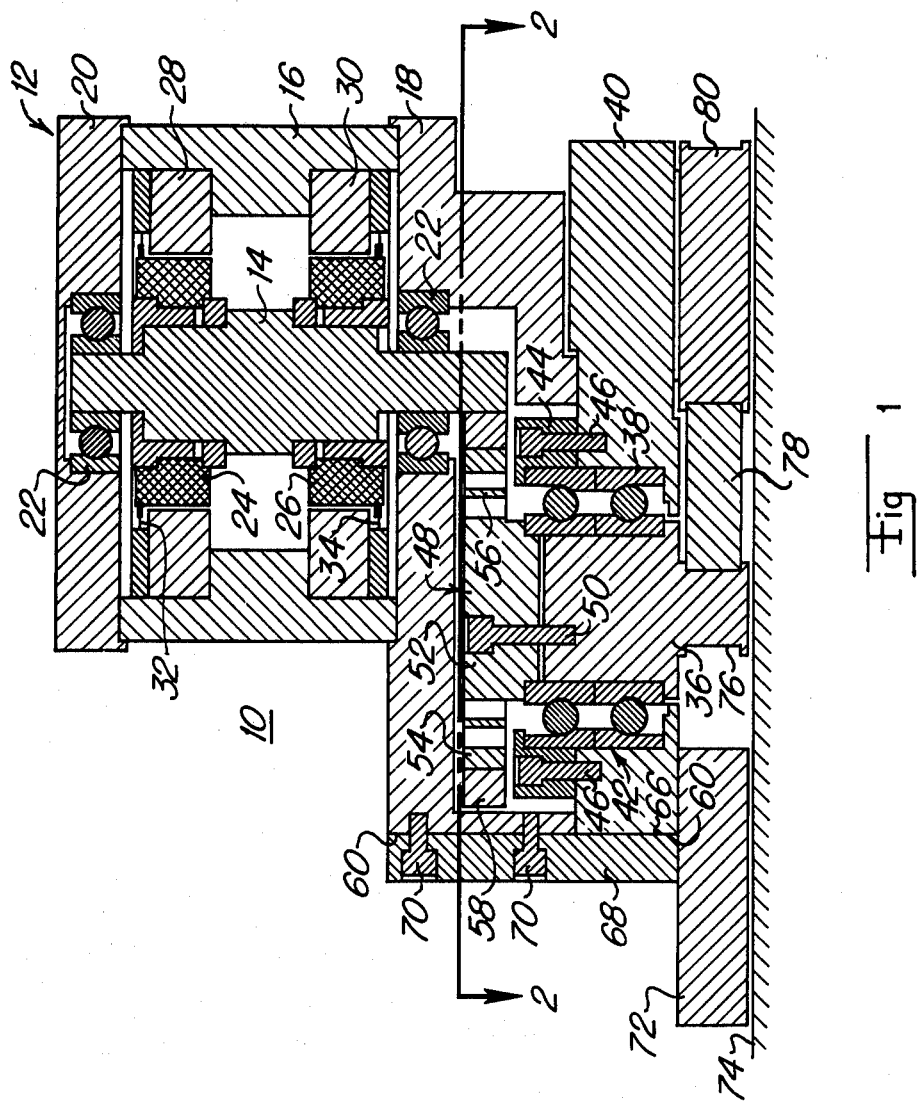
FIG. 1 is a half-sectional view of a friction drive of the reduction type in accordance with the illustrated preferred embodiment of this invention.

Referring to FIG. 1, there is shown a friction drive 10 of the reduction type including a motor-tachometer 12 that may be of a conventional commercially available type and that is provided with a drive shaft 14 made of AISI type D3 tool steel hardened and drawn to 64–66 Rc or some other such hardened material. Motor-tachometer 12 has a cylindrical housing 16 fixedly secured to an upper support member 18, and a circular cover plate 20 fixedly secured to the top of the housing. Drive shaft 14 is coaxially and rotatably supported within housing 16 by a pair of annular bearing units 22, one of which is fixedly secured within cover plate 20 and the other of which is fixedly secured within upper support member 18. Annular motor and tachometer armatures 24 and 26, respectively, are fixedly secured to drive shaft 14 at spaced positions therealong for rotation therewith. Corresponding annular motor and tachometer field magnets 28 and 30, respectively, and corresponding annular motor and tachometer brush riggings 32 and 34, respectively, are coaxially and fixedly secured within housing 16 around motor and tachometer armatures 24 and 26, respectively. Motor-tachometer 12 may be employed to rotate drive shaft 14 either clockwise or counterclockwise an amount precisely determined by control signals applied to motor brush rigging 32 from a position control circuit or the like that is in turn responsive to feedback signals provided by tachometer brush rigging 34.

Figure 2:
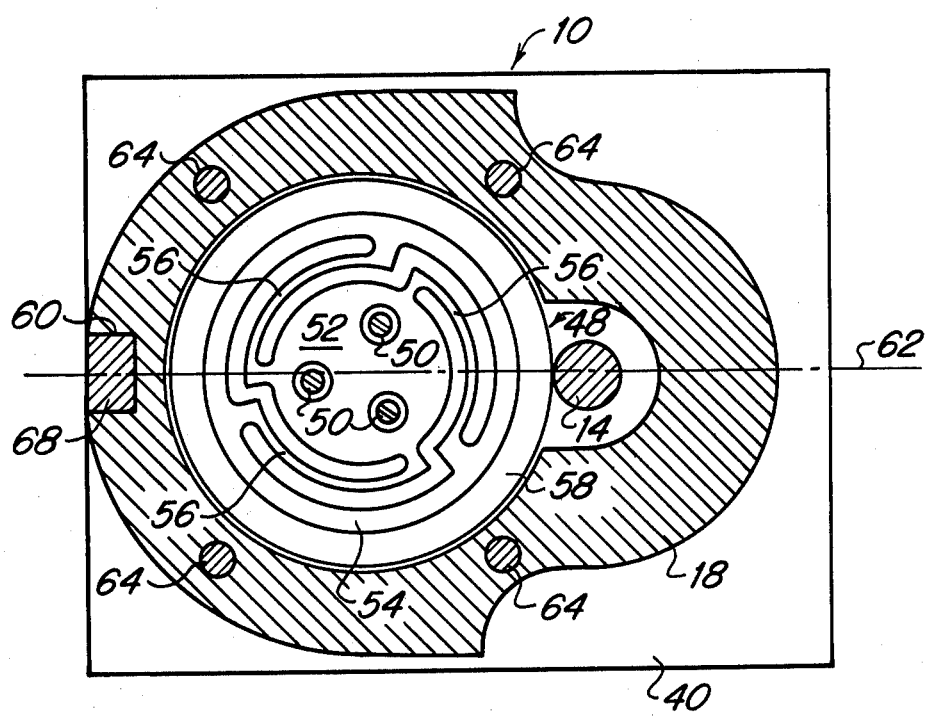
FIG. 2 is a sectional view of the friction drive taken along the line 2—2 of FIG. 1.
Figure 3:
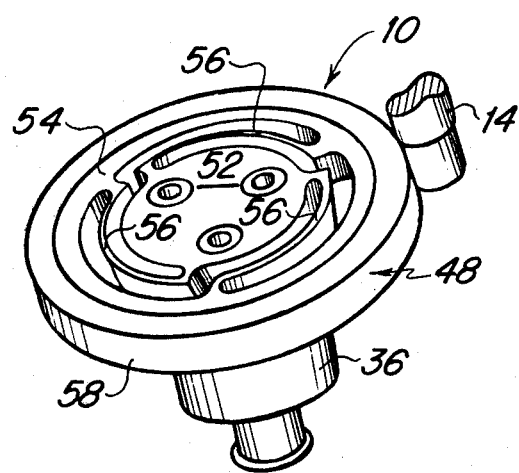
FIG. 3 is a perspective view of a portion of the friction drive of FIGS. 1 and 2.

With reference now to FIGS. 1, 2, and 3, friction drive 10 further includes a driven shaft 36 made, for example, of 440C stainless steel hardened and drawn to 58–60 Rc or some other such hardened material. Driven shaft 36 is coaxially and rotatably supported within a cylindrical opening 38 of a lower support member 40 parallel to drive shaft 14 by an annular duplex ground angular contact bearing unit 42. The lower half of this duplex ground angular contact bearing unit 42 is captivated entirely within cylindrical opening 38 of lower support member 40, while the upper half is captivated partially within the same cylindrical opening and partially within an adjoining annular retainer 44 fixedly secured to the upper surface of the lower support member by screws 46. A compliant rotary member 48 of greater diameter than both the drive shaft 14 and the driven shaft 36 is fixedly secured to the top of the driven shaft by three angulary and symmetrically spaced screws 50 and is loaded against the lower end of the drive shaft, as hereinafter explained, so as to rotate the driven shaft in response to rotation of the drive shaft, but at a lower speed than the drive shaft.

Compliant rotary member 48 comprises a circular central portion 52 and an annular outer portion 54 coupled to the central portion by three (or more) circumferentially extending springs 56 symmetrically arranged around the periphery of the central portion and each rigidly attached at one end to the central portion and at the other end to the outer portion. This provides compliant rotary member 48 with maximum radial compliance opposite drive shaft 14 and with minimum tangential compliance (the stiffness of the compliant rotary member increases as more springs are employed). Compliant rotary member 48 may be made, for example, of beryllium copper or some other such resilient material and may also be provided with an annular tire 58 fixedly secured to the outer portion 54 of the compliant rotary member and made, for example, of 4340 aircraft alloy steel hardened and drawn to 50–54 Rc or some other such material moderately hardened compared to the hardness of drive shaft 14. By employing such a compliant rotary member 48, the precision of concentricity and diameter of drive shaft 14, driven shaft 36, and the compliant rotary member itself is much less critical than would otherwise be the case in friction drive 10.

With reference now particularly to FIGS. 1 and 2, each of the upper and lower support members 18 and 40 is provided with a matching vertically extending slot 60 at one end thereof directly opposite drive shaft 14 and along a common centerline 62 of the slot, the central portion 52 of compliant rotary member 48, and the drive shaft. In assembling friction drive 10, the upper and lower support members 18 and 40 are positioned with the matching slots 60 in vertical alignment and with the compliant rotary member 48 in contact with the lower end of drive shaft 14, and are secured together in that position by screws 64 extending upwardly through counterbored clearance holes in the lower support member and into adjoining threaded screw holes in the upper support member. The screws 64 are not initially screwed tightly into place so as to permit slight horizontal relative movement between the upper and lower support members 18 and 40 as allowed by the clearance space between those screws and the corresponding clearance holes in the lower support member.

Figure 4:
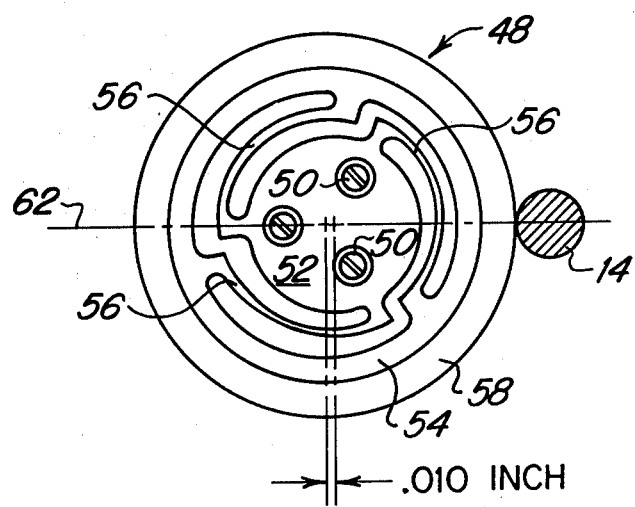
FIG. 4 is an exaggerated top plan view of the drive shaft and the rotary compliant member of FIGS. 1, 2 and 3.

A shim 66 of, for example, 0.010 inch is placed in slot 60 of the lower support member 40, and a solid bar 68 is then fixedly secured in slots 60 by a pair of screws 70 screwed into the upper support member 18. This offsets the lower support member 40 relative to the upper support member 18 and, hence, compliant rotary member 48 relative to drive shaft 14 in the direction of the drive shaft by a distance equal to the thickness of shim 66 (i.e., 0.010 inch), and thereby loads the compliant rotary member against the lower end of the drive shaft. The outer portion 54 and tire 58 of compliant rotary member 48 are accordingly eccentrically offset from the central portion 52 of the compliant rotary member by the same distance in a radial direction along centerline 62 opposite drive shaft 14, as shown in the exaggerated view of FIG. 4. For a compliant rotary member 48 having a minimum thickness of about 0.300 inch, a central portion 52 with a diameter of about 1.200 inches, an annular outer member 54 with an inner diameter of about 1.827 inches, and springs 56 with a width of about 0.051 inch, the above-described offset of 0.010 inch loads the compliant rotary member against the lower end of drive shaft 14 with about forty pounds of force. At this point, the screws 64 are tightly screwed into place so as to fixedly secure the upper and lower support members 18 and 40 together and prevent any further relative movement therebetween.

Friction drive 10 may be employed, for example, to position a stage of a precision step-and-repeat alignment and exposure system or the like along a first coordinate axis (for example, an X axis) of the system. In this application the lower support member 40 may be fixedly secured on a lower platform 72 of the stage, the lower platform in turn being supported for movement along the upper surface of a granite block 74 by air bearings or the like. Concomitantly, the lower end of driven shaft 36 may be formed as a capstan 76 for engaging one side of a drive bar 78 extending along the first coordinate axis. This capstan 76 may be held in engagement with drive bar 78 by a pressure roller 80 rotatably supported by the lower support member 40 in engagement with the other side of the drive bar. As driven shaft 36 is rotated clockwise or counterclockwise, capstan 76 and, hence, friction drive 10 and the lower platform 72 of the stage move backward or forward along drive bar 78 and, hence, along the first coordinate axis. Another friction drive 10 may be employed in the same manner to move an upper platform of the stage along another drive bar extending along a second coordinate axis (for example, a Y axis) of the system, the upper platform also being supported for movement along the upper surface of granite block 74 by air bearings or the like located within clearance openings in the lower platform 72 and being coupled to the lower platform for movement therewith along the first coordinate axis of the system.

I claim:

1. A friction drive comprising:

a rotary drive member;

a rotary driven member; and a compliant rotary member for coupling the rotary drive member and the rotary driven member together, the compliant rotary member being loaded against at least one of those members;

the compliant rotary member having a circular inner portion and an annular outer portion resiliently and eccentrically offset relative to one another and further having at least three circumferentially extending spring elements symmetrically disposed around the periphery of the inner portion, each of those circumferentially extending spring elements being entirely circumferential in an unloaded condition of the compliant rotary member, being rigidly attached at one end to the inner portion and being rigidly attached at another end to the outer portion.

2. A friction drive as in claim 1 wherein:

the rotary drive member comprises a rotary drive shaft;

the rotary driven member comprises a rotary driven shaft; and the compliant rotary member is fixedly secured to one of the rotary drive and rotary driven shafts and loaded against the other of those shafts.

3. A friction drive as in claim 2 wherein:

the rotary drive shaft is made of a harder material than the outer periphery of the compliant rotary member; and the compliant rotary member is of a larger diameter than the rotary drive shaft, is fixedly secured to the rotary driven shaft for rotation therewith, and is loaded against the rotary drive shaft for rotation thereby.

4. A friction drive as in claim 3 wherein:

the rotary drive shaft is rotatably supported by a first support member;

the rotary driven shaft is rotatably supported by a second support member; and the first and second support members are secured together with the compliant rotary member loaded against the rotary drive shaft and with the outer portion of the compliant rotary member eccentrically offset from the inner portion of the compliant rotary member in a radial direction opposite the rotary drive shaft.

5. A friction drive as in claim 4 wherein:

the drive includes a motor-tachometer for rotating the rotary drive shaft;

one of the support members is fixedly secured to a movable stage; and the rotary driven shaft is engaged with a drive bar for moving the stage along the drive bar.

6. A compliant rotary member comprising:

a central portion;

an annular outer portion; and at least three circumferentially extending spring elements symmetrically disposed around the periphery of the central portion, each of those circumferentially extending spring elements being entirely circumferential in an unloaded condition of the compliant rotary member, being rigidly attached at one end to the central portion and being rigidly attached at another end to the outer portion.

7. A compliant rotary member as in claim 6 wherein:

the central portion has a central axis; and each circumferentially extending spring element is of greater dimension axially than radially with respect to the central axis to adapt the annular outer portion for being eccentrically offset from the central portion with respect to the central axis.

8. A compliant rotary member as in claim 7 wherein:

the central portion is a solid circular portion; and the annular outer portion includes an inner annular element of the same material as the central portion and the circumferentially extending spring elements, and an outer annular element of a harder material than the inner annular element.

9. A friction drive as in claim 2 wherein the annular outer portion of the compliant rotary member includes:

a first rigid annular portion to which the circumferentially extending spring elements are attached; and a second rigid annular portion mounted on the periphery of the first annular portion in contact with said other shaft, the second annular portion being made of a material of lesser hardness than said other shaft.

10. A friction drive as in any of the preceding claims 1, 2, 3, 4, 5 or 9 wherein:

the inner portion of the compliant rotary member has a central axis; and each circumferentially extending spring element of the compliant rotary member is of greater dimension axially than radially with respect to the central axis to adapt the annular outer portion for being eccentrically offset from the inner portion with respect to the central axis.

* * * * *